US012455110B2

(12) United States Patent
Lyu et al.

(10) Patent No.: US 12,455,110 B2
(45) Date of Patent: Oct. 28, 2025

(54) REFRIGERATOR AND DOOR ASSEMBLY THEREFOR

(71) Applicants: QINGDAO HAIER REFRIGERATOR CO., LTD., Qingdao (CN); HAIER SMART HOME CO., LTD., Qingdao (CN)

(72) Inventors: Peng Lyu, Qingdao (CN); Hao Zhang, Qingdao (CN); Wenchun Wang, Qingdao (CN); Zhiwei Ren, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 167 days.

(21) Appl. No.: 18/273,029

(22) PCT Filed: Jan. 7, 2022

(86) PCT No.: PCT/CN2022/070749
§ 371 (c)(1),
(2) Date: Jul. 18, 2023

(87) PCT Pub. No.: WO2022/152059
PCT Pub. Date: Jul. 21, 2022

(65) Prior Publication Data

US 2024/0118017 A1 Apr. 11, 2024

(30) Foreign Application Priority Data

Jan. 18, 2021 (CN) ......................... 202110063723.6

(51) Int. Cl.
*F25D 23/02* (2006.01)

(52) U.S. Cl.
CPC ........... *F25D 23/028* (2013.01); *F25D 23/02* (2013.01); *E05Y 2900/31* (2013.01); *F25D 2323/02* (2013.01); *F25D 2323/021* (2013.01)

(58) Field of Classification Search
CPC .. F25D 23/028; F25D 23/02; F25D 2323/021; F25D 2400/06; F25D 23/087; F25D 2323/02; E05Y 2900/31
See application file for complete search history.

(56) References Cited

FOREIGN PATENT DOCUMENTS

| | | |
|---|---|---|
| CN | 204301394 U | 4/2015 |
| CN | 106352651 A | 1/2017 |

(Continued)

*Primary Examiner* — Kimberley S Wright
(74) *Attorney, Agent, or Firm* — Cheng-Ju Chiang

(57) ABSTRACT

Disclosed are a refrigerator and a door assembly therefor; the door assembly includes two oppositely arranged doors and a turnover beam assembly, wherein the turnover beam assembly includes: a turnover beam body; a guide part extending out of one end of the turnover beam body and configured to be fitted with a retainer provided on a cabinet of the refrigerator; a locking part telescopically provided in the turnover beam body and having a first end fixedly connected with the guide part and a second end having a locking portion, the locking part having an unlocking state and a locking state. In the present invention, an anti-turnover function of the turnover beam body is achieved using the locking part and the elastic part, which improves coordination among all components, makes an internal structure of the turnover beam assembly more reasonable, achieves high practicability, and realizes easy popularization.

15 Claims, 13 Drawing Sheets

(56) References Cited

FOREIGN PATENT DOCUMENTS

| | | | |
|---|---|---|---|
| CN | 107024069 | A | 8/2017 |
| CN | 107461992 | A | 12/2017 |
| CN | 107976000 | A | 5/2018 |
| CN | 108120215 | A | 6/2018 |
| CN | 208901713 | U | 5/2019 |
| CN | 209063976 | U | 7/2019 |
| CN | 211650916 | U | 10/2020 |
| JP | H2-40873 | U | 3/1990 |

REFRIGERATOR AND DOOR ASSEMBLY THEREFOR

CROSS REFERENCE TO RELATED APPLICATIONS

The present invention is a 35 U.S.C. § 371 National Phase conversion of International (PCT) Patent Application No. PCT/CN2022/070749, filed on Jan. 7, 2022, which claims benefit of Chinese Application No. 202110063723.6, filed on Jan. 18, 2021, the disclosure of which is incorporated by reference herein. The PCT International Patent Application was filed and published in Chinese.

TECHNICAL FIELD

The present invention relates to a refrigeration and freezing technology, and in particular, to a refrigerator and a door assembly therefor.

BACKGROUND

In order to increase a storage space of a refrigerator, a side-by-side refrigerator in which a longitudinal vertical beam in a storage compartment is omitted emerges in a prior art, and in consideration of sealing of a gap between two doors, in the refrigerator, a turnover beam is provided on one door and unfolded after the door is closed under an action of a retainer of a cabinet, so as to seal the gap between the doors. For example, a refrigerator with a turnover beam emerges in the prior art, and the turnover beam includes a body, a front cover, and a sheet metal part, and is guided to rotate using a protrusion when the door is closed, so as to seal the gap between the two doors, and a gap between the door and the turnover beam is sealed using a rubber sealing member known in the art.

Further, in order to allow the turnover beam to smoothly enter the retainer under guidance of the protrusion when the door is closed, solutions from the following several perspectives emerge in the prior art.

Firstly, the retainer on the cabinet is improved, a spring is added to enable the retainer to move up and down, and when the protrusion deviates from a track of the retainer, the retainer moves up, and finally, after the door is completely closed, the protrusion enters the track. However, the solution is not beneficial to the guidance of the turnover beam and has low practicability.

Secondly, a turnover beam also emerges in the prior art, and a torsion spring is added on the turnover beam, such that when the door is in an open state, the turnover beam can return to a folded state under an action of the torsion spring. This solution also has certain defects: first, return and guidance of the turnover beam are not combined, that is, have independent section structures, which certainly causes poor coordination and a complicated structure. Second, although the turnover beam can return when the door is opened, the turnover beam is still rotatable and also has a risk of being incapable of smoothly entering a guide rail of the retainer.

Finally, a turnover beam combining an anti-turnover function and a guiding function also emerges in the prior art, and when the door of the refrigerator is closed, the protrusion on the turnover beam is pressed down and drives a link mechanism to move downwards, such that a lower end of the link mechanism and a rotating shaft are unlocked, and the turnover beam is smoothly unfolded; when the door of the refrigerator is opened, the turnover beam is independently bounced under an action of one spring, and the link mechanism is independently bounced under an action of the other spring, such that a link and the rotating shaft are locked.

The solution in the prior art has the following defects: first, in the prior art, return of the protrusion and the link mechanism of the turnover beam is independently realized using a plurality of return springs, resulting in poor coordination between the protrusion and the link mechanism and poor reliability; and second, the link mechanism of the turnover beam in the prior art has a complex structure, a large occupied space, difficult mounting and poor part universality and is not conducive to mass production.

SUMMARY

An object of the present invention is to overcome at least one of defects in a prior art and provide a door assembly for a refrigerator.

A further object of the present invention is to make an internal structure of a turnover beam assembly more reasonable.

Another object of the present invention is to improve reliability of the turnover beam assembly.

Particularly, the present invention provides a door assembly for a refrigerator, including two oppositely arranged doors and a turnover beam assembly, wherein the turnover beam assembly includes:

- a turnover beam body configured to be provided on one of the doors in a turnover manner by a pivoting part;
- a guide part extending out of one end of the turnover beam body and configured to be fitted with a retainer provided on a cabinet of the refrigerator;
- a locking part telescopically provided in the turnover beam body and having a first end fixedly connected with the guide part and a second end having a locking portion for limiting turnover of the turnover beam body, the locking part being configured to have a retracted unlocking state and an extended locking state, and when the locking part is in the unlocking state, the locking portion abutting against a stopping portion provided on the pivoting part; and
- an elastic part configured to apply, to the locking part, an elastic pre-tightening force for urging the locking part into the locking state; and the turnover beam assembly is configured such that
- when the door where the turnover beam body is located is closed, the guide part is pressed down by the retainer to keep the locking part in the unlocking state; and
- when the door where the turnover beam body is located is opened and after the guide part is separated from the retainer, the locking part is in the locking state under an action of the elastic pre-tightening force.

Further, a middle portion of the locking part is provided with a sliding hole extending in the telescopic direction of the locking part, and a limiting groove is formed in a side wall of at least one side of the sliding hole; and the turnover beam assembly further includes:

- a limiting part fixedly provided on the turnover beam body and located at the sliding hole, the limiting part having a projection portion fitted with the limiting groove to limit a telescopic track of the locking part.

Further, the limiting part further has a first mounting column extending towards the first end of the locking part, and a second mounting column is convexly formed on a wall surface of the sliding hole opposite to the first mounting column; and the first mounting column and the second mounting column are sleeved with two ends of the elastic part respectively.

Further, the locking part further has an abutting portion transversely extending outside the sliding hole, and the abutting portion is configured to abut against the limiting part to limit a telescopic distance of the locking part.

Further, a door liner is provided on an inner side of the door, and the door liner of the door where the turnover beam body is located is inwards recessed to form a mounting space;

the pivoting part includes:

a fixed portion provided in the mounting space and provided with a first clamping portion; and a rotating shaft portion including a connecting plate, a second clamping portion clamped to the first clamping portion being formed on one surface of the connecting plate to fix one end of the pivoting part to the door.

Further, the rotating shaft portion further includes:

a link formed on a surface of the connecting plate opposite to the second clamping portion, and extending into the turnover beam body; and a pivoting shaft rotatably provided on an end portion of the link in the turnover beam body, the stopping portion being formed on the pivoting shaft.

Further, after the connecting plate and the fixed portion are fixed, the connecting plate is flush with a surface of the door liner.

Further, the turnover beam body is provided with a telescopic hole for the guide part to extend out, at least one part of a circumference of the telescopic hole is convexly provided with a reinforcing rib, and the reinforcing rib is attached to a section of the guide part extending out of the telescopic hole, so as to prevent the guide part from shaking in the process of fitting with the retainer.

Further, a guide groove is further formed in the reinforcing rib; and a guide projection is further formed on a surface of the guide part facing the reinforcing rib, and the guide projection is fitted with the guide groove to limit a moving track of the guide part.

Particularly, the present invention further provides a refrigerator including the door assembly according to any one of the above descriptions.

In the door assembly according to the present invention, the turnover beam body is configured to be provided on the door in the turnover manner by the pivoting part, the locking part is telescopically provided in the turnover beam body of the door, the first end of the locking part is fixedly connected with the guide part of the door, the second end of the locking part has the locking portion for limiting the turnover of the turnover beam body of the door, and the elastic part can apply, to the locking part, the elastic pre-tightening force for urging the locking part to extend for a locked state of the door. When the door where the turnover beam body is located is closed, the guide part enters a guide rail and drives the locking part to retract under pressing of an upper surface of the guide rail, such that the locking portion is separated from the stopping portion of the pivoting part. When the door where the turnover beam body is located is opened and after the guide part is separated from the upper surface of the guide rail, the pressing force of the guide part by the upper surface of the guide rail disappears, and the guide part and the locking part extend out under the action of the elastic pre-tightening force of the elastic part, such that the locking portion abuts against the stopping portion of the pivoting part; that is, the locking part is in the locking state. Therefore, in the turnover beam assembly in the present invention, an anti-turnover function of the turnover beam body is achieved by only adopting one locking part and one elastic part, which simplifies a traditional transmission structure, makes an internal structure of the turnover beam assembly more reasonable, achieves high part universality, is beneficial to mass production and improves coordination among components.

Further, in the door assembly according to the present invention, the middle portion of the locking part is provided with the sliding hole extending in the telescopic direction of the locking part, the limiting groove is formed in the side wall of at least one side of the sliding hole, the limiting part is fixedly provided on the turnover beam body and located at the sliding hole, and the limiting part has the projection portion fitted with the limiting groove, so as to limit the telescopic track of the locking part. The limiting part further has the first mounting column extending towards the first end of the locking part, the second mounting column is convexly formed on the wall surface of the sliding hole opposite to the first mounting column, and the first mounting column and the second mounting column are sleeved with the two ends of the elastic part respectively. The locking part further has the abutting portion transversely extending outside the sliding hole, and the abutting portion is configured to abut against the limiting part to limit the telescopic distance of the locking part. Therefore, the limiting part in the door assembly according to the present invention can not only restrain a freedom degree of the locking part with the projection portion thereon, but also be configured to be provided with the elastic part, and can also prevent the locking part from excessively extending, thus improving reliability of the turnover beam assembly.

The above and other objects, advantages and features of the present invention will become more apparent to those skilled in the art from the following detailed description of specific embodiments thereof taken in conjunction with the accompanying drawings.

BRIEF DESCRIPTION OF THE DRAWINGS

Some specific embodiments of the invention will be described in detail hereinafter by way of example and not by way of limitation with reference to the accompanying drawings. The same reference numerals identify the same or similar components or parts in the drawings. Those skilled in the art should appreciate that the drawings are not necessarily drawn to scale. In the drawings.

DETAILED DESCRIPTION

Figure 1:
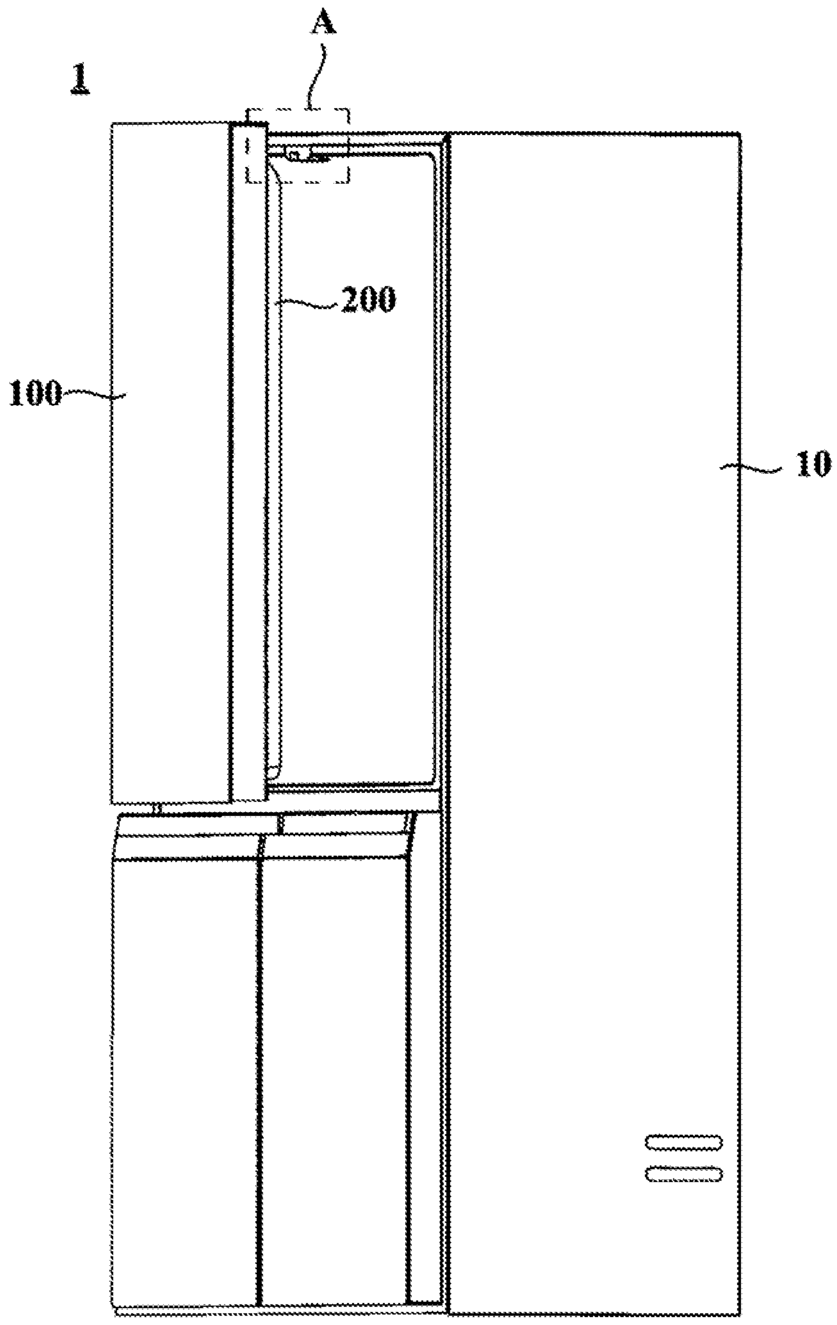
FIG. 1 is a schematic diagram of a refrigerator according to an embodiment of the present invention, in which a door without a turnover beam assembly is hidden.

In the description of the present embodiment, it should be understood that the terms "longitudinal", "transverse", "length", "width", "thickness", "upper", "lower", "front", "rear", "left", "right", "vertical", "horizontal", "top", "bottom", "depth", or the like, indicate orientations or positional relationships based on orientations in a normal use state of a refrigerator and can be determined with reference to orientations or positional relationships shown in the drawings, for example, "front" indicating an orientation refers to a side of the refrigerator facing a user. The terms are used only for describing the present invention and for description simplicity, but do not indicate or imply that an indicated device or element must have a specific orientation or be constructed and operated in a specific orientation. Therefore, it cannot be understood as a limitation on the present invention.

Reference is made to FIG. 1 which is a schematic diagram of a refrigerator according to an embodiment of the present invention, in which a door without a turnover beam is hidden. The present invention provides a refrigerator 1, which may generally include a cabinet 10, and the cabinet 10 may include a shell, a heat insulation layer, a plurality of inner liners and other accessories. The shell serves as an outer layer structure of the refrigerator 1 and protects the whole refrigerator 1; in order to insulate heat conduction from the outside, the heat insulation layer is provided between the shell and the inner liner of the cabinet 10, and the heat insulation layer is generally formed by a foaming process. The inner liner can internally define a storage compartment, such as a refrigerating chamber, a freezing chamber or a variable temperature chamber. In the present embodiment, the refrigerator 1 may further include a door assembly, the door assembly may further include two oppositely arranged doors 100 provided in front of at least one storage compartment, and a turnover beam assembly 200 provided on one of the doors 100, and the two doors 100 may be rotatably connected to the cabinet 10 by a hinge assembly, or the like, so as to open and close the storage compartment.

In a traditional side-by-side refrigerator, since a gap exists between the two doors, cold air in the storage compartment flows out from the gap after the doors are closed, resulting in a poor refrigerating effect of the refrigerator. Therefore, in order to overcome the above-mentioned defect, in the refrigerator 1 according to the present embodiment, the turnover beam assembly 200 is provided on one of the doors 100. The turnover beam assembly 200 can seal the gap between the two doors 100 after the two doors are closed, thus reducing energy consumption and improving a refrigeration efficiency.

Figure 2:
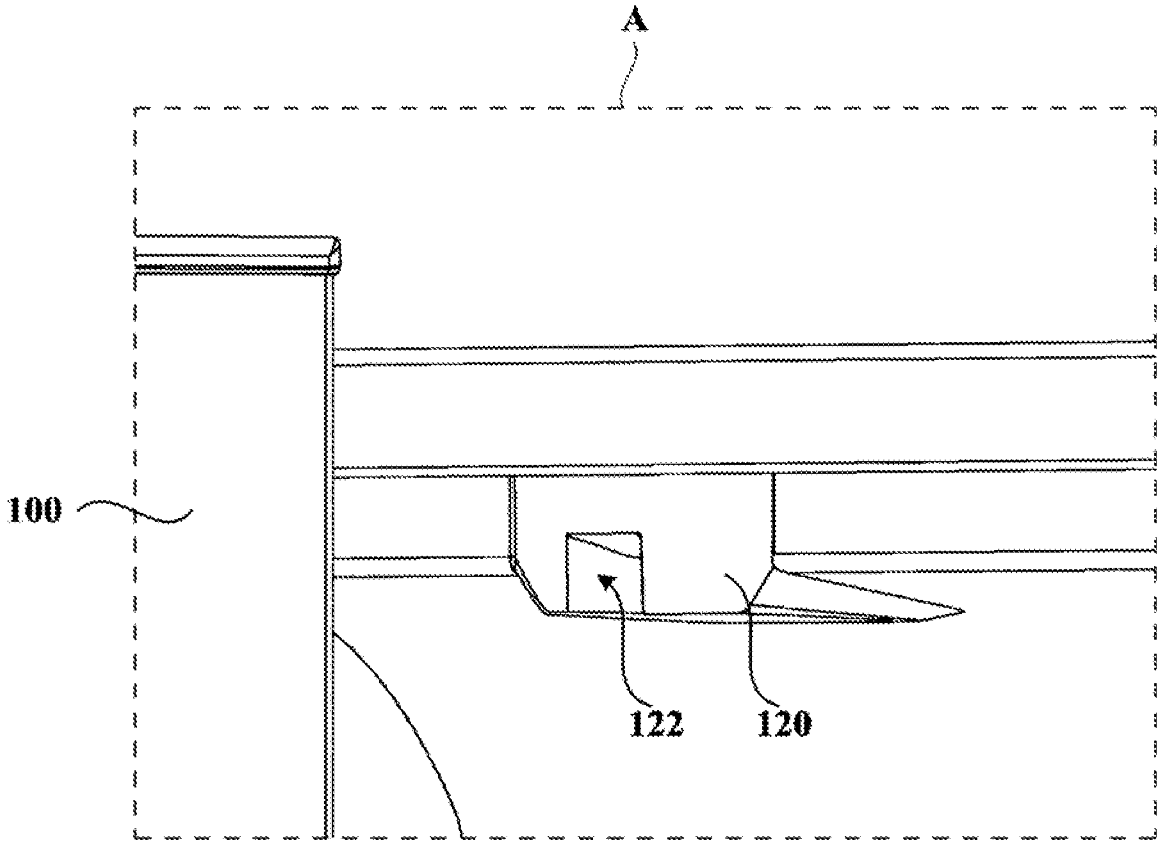
FIG. 2 is an enlarged view at A of FIG. 1 showing a retainer on a cabinet of the refrigerator.
Figure 3:
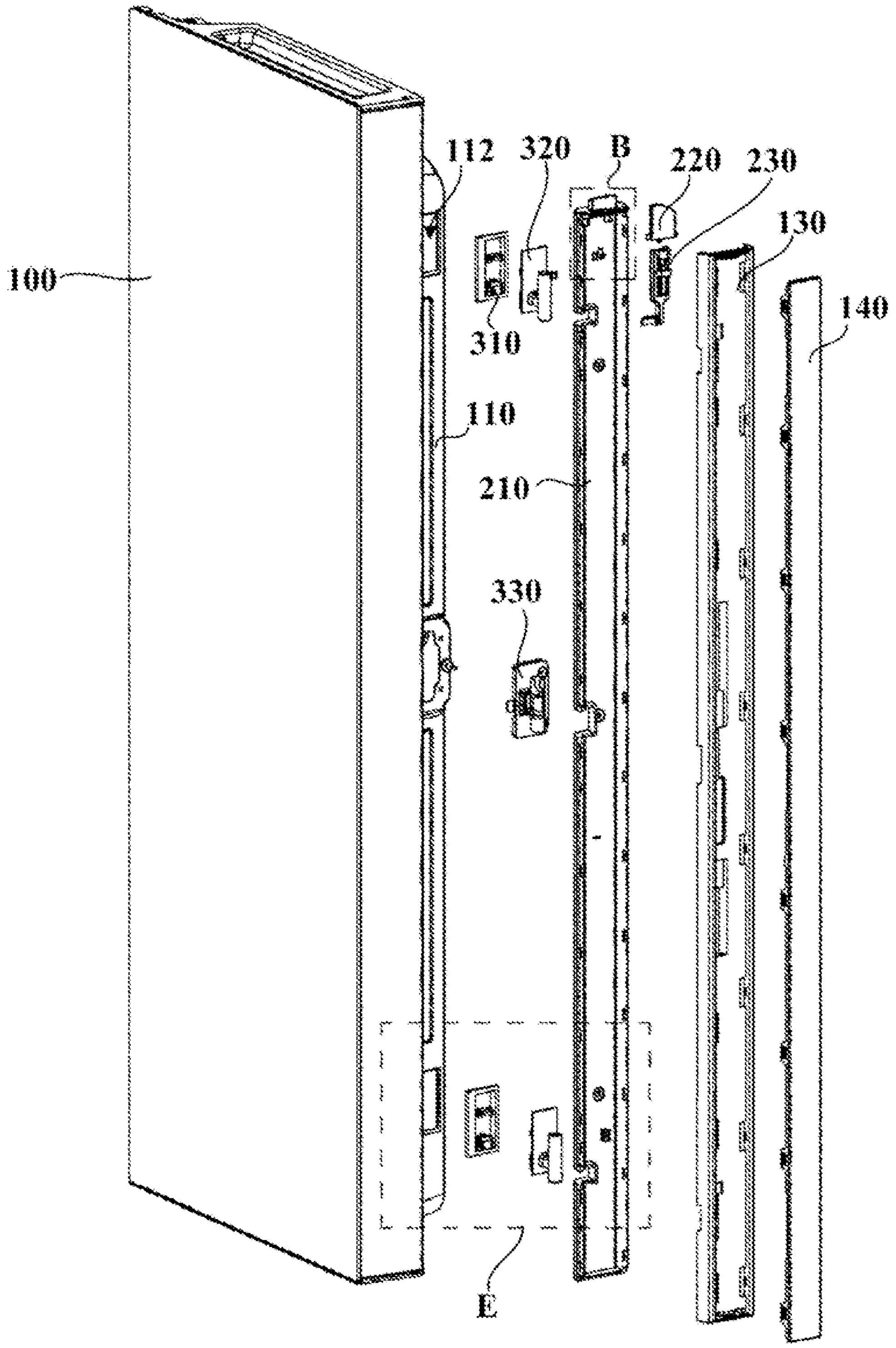
FIG. 3 is an exploded view of a door assembly in a refrigerator according to an embodiment of the present invention.
Figure 4:
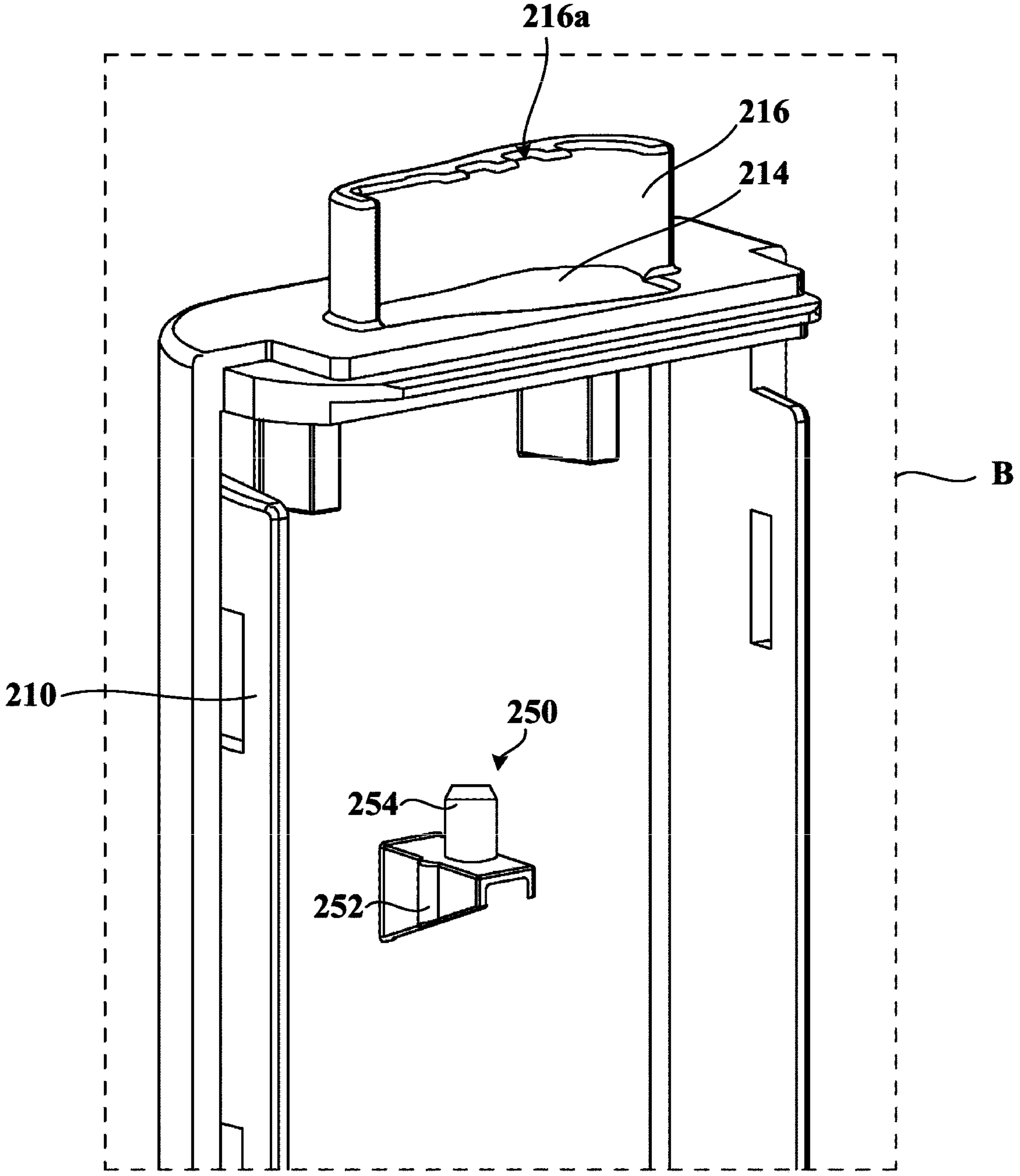
FIG. 4 is an enlarged view at B of FIG. 3 showing a partial structure of a turnover beam body.
Figure 5:
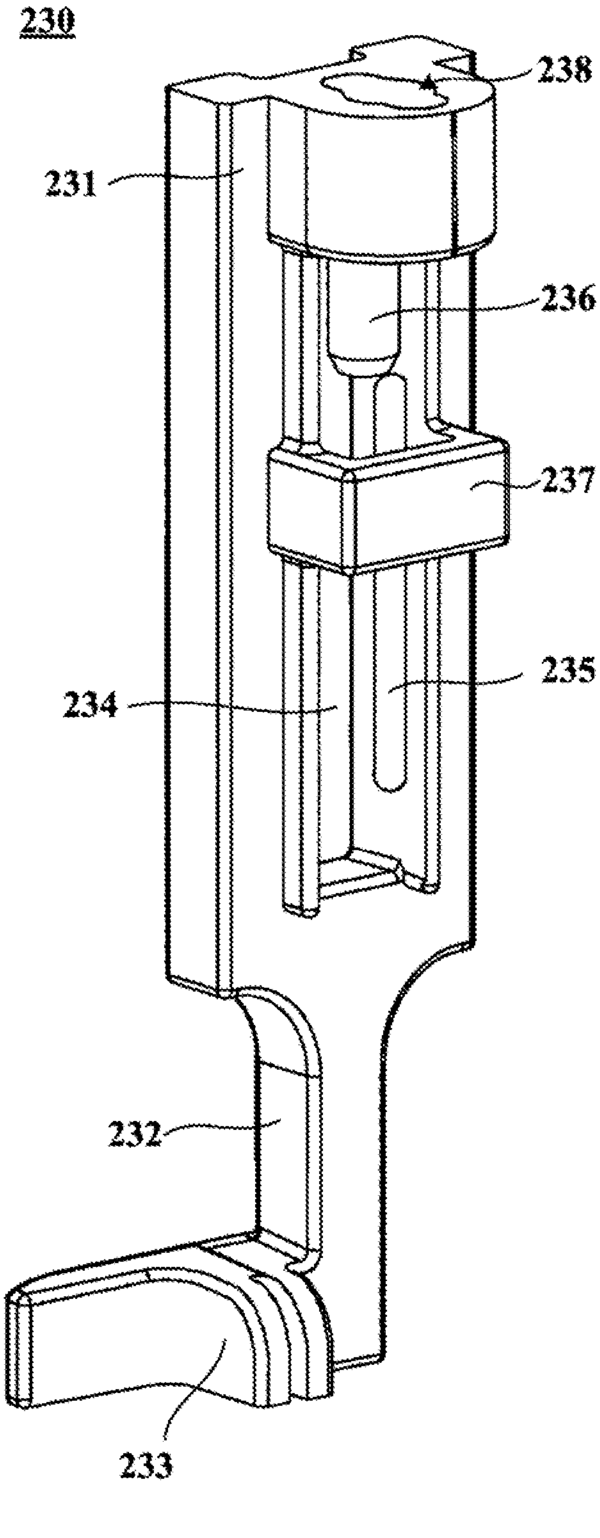
FIG. 5 is a schematic diagram of a locking part in a door assembly according to an embodiment of the present invention.
Figure 6:
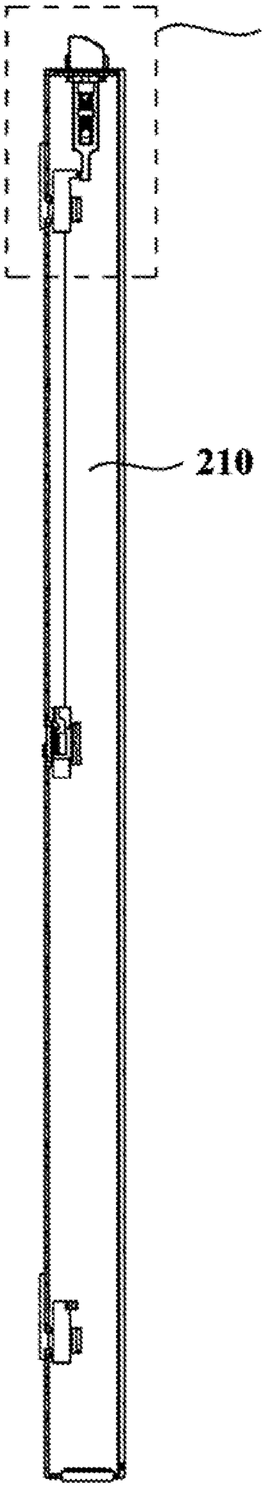
FIG. 6 is a schematic diagram of a locking part in a door assembly according to an embodiment of the present invention in a locking state, in which a front cover of a turnover beam body is hidden.
Figure 7:
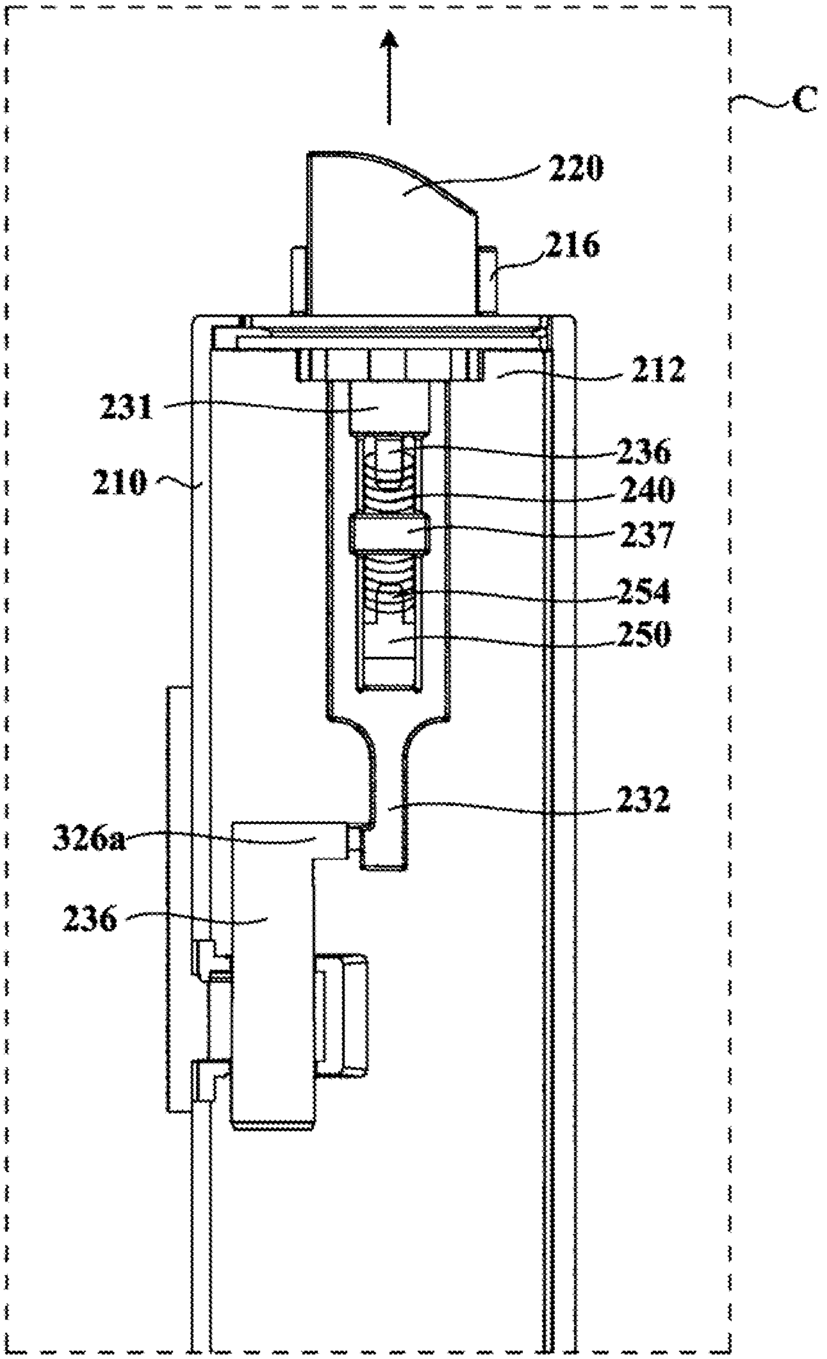
FIG. 7 is an enlarged view at C of FIG. 6.
Figure 8:
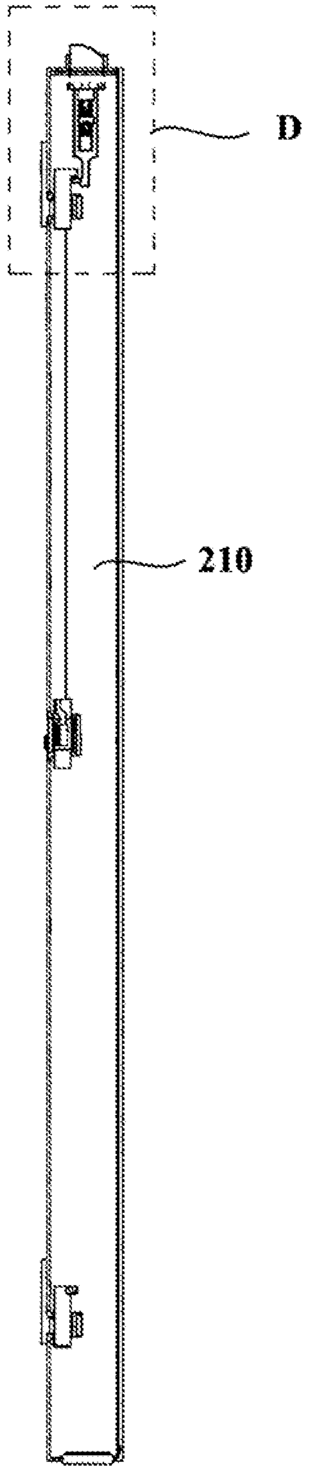
FIG. 8 is a schematic diagram of a locking part in a door assembly according to an embodiment of the present invention in an unlocking state, in which a front cover of a turnover beam body is hidden.
Figure 9:
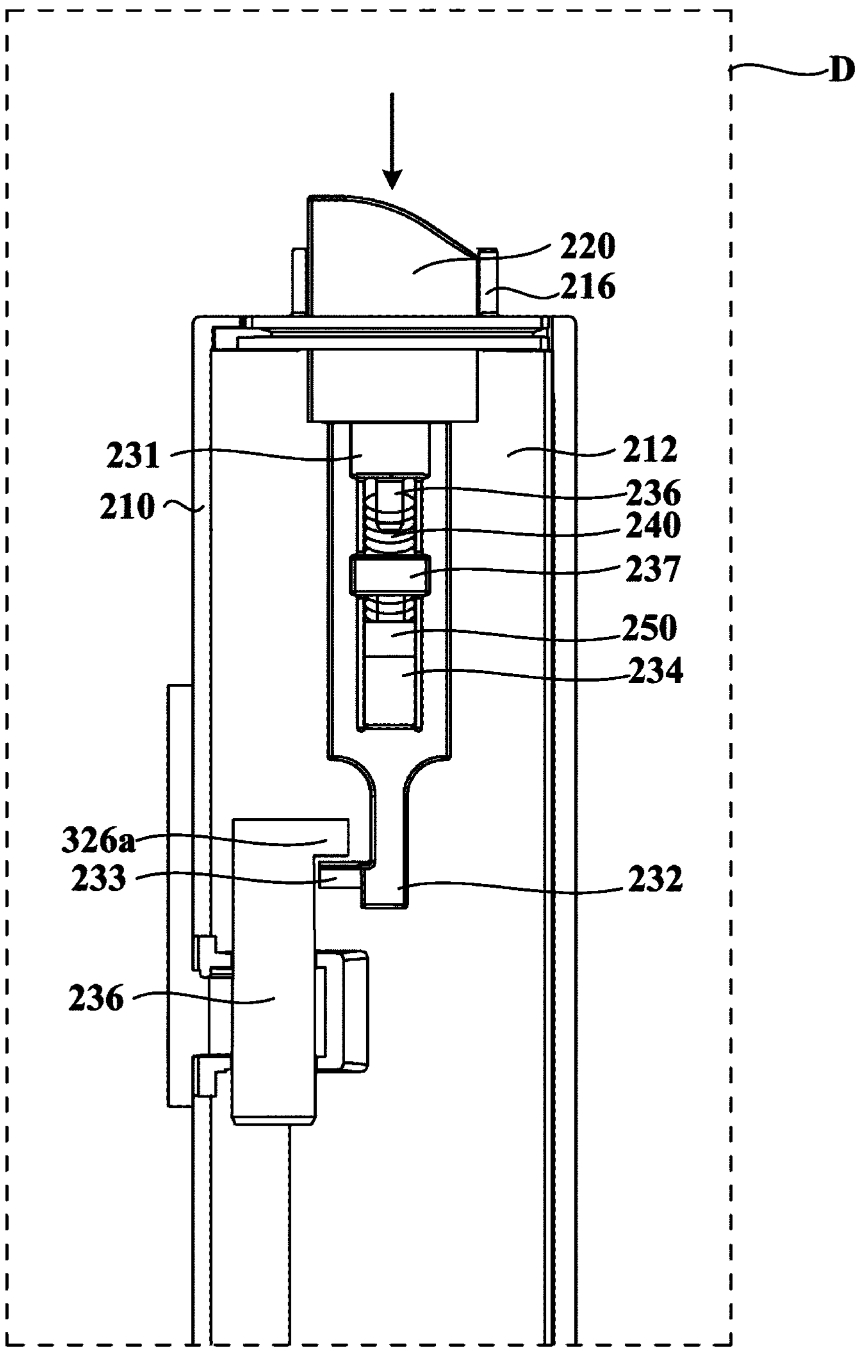
FIG. 9 is an enlarged view at D of FIG. 8.

Referring to FIGS. 1 to 9, FIG. 2 is an enlarged view at A of FIG. 1 showing a retainer on the cabinet of the refrigerator, FIG. 3 is an exploded view of the door assembly in the refrigerator according to an embodiment of the present invention, FIG. 4 is an enlarged view at B of FIG. 3 showing a partial structure of a turnover beam body, FIG. 5 is a schematic diagram of a locking part in the door assembly according to an embodiment of the present invention, FIG. 6 is a schematic diagram of the locking part in the door assembly according to an embodiment of the present invention in a locking state, in which a front cover of the turnover beam body is hidden, FIG. 7 is an enlarged view at C of FIG. 6, FIG. 8 is a schematic diagram of the locking part in the door assembly according to an embodiment of the present invention in an unlocking state, in which the front cover of the turnover beam body is hidden, and FIG. 9 is an enlarged view at D of FIG. 8.

Specifically, the turnover beam assembly 200 may include a turnover beam body 210, a guide part 220, a locking part 230, and an elastic part 240. The turnover beam body 210 is configured to be provided on the door 100 in a turnover manner by a pivoting part; the guide part 220 extends out of one end of the turnover beam body 210 and is configured to be fitted with a retainer 120 provided on the cabinet 10 of the refrigerator 1; the locking part 230 is telescopically provided in the turnover beam body 210 and has a first end 231 fixedly connected with the guide part 220 and a second end 232 having a locking portion 233 for limiting turnover of the turnover beam body 210, the locking part 230 is configured to have a retracted unlocking state and a locking state, and when the locking part 230 is in the unlocking state, the locking portion 233 abuts against a stopping portion *326a* provided on the pivoting part; and the elastic part 240 is configured to apply, to the locking part 230, an elastic pre-tightening force for urging the locking part to extend for the locking state.

Referring to FIGS. 3 to 9, in the present embodiment, the turnover beam body 210 internally defines an accommodating chamber 212, the accommodating chamber 212 may be sealed by a front cover 130, and the front cover 130 may further be provided with a sheet metal decorative strip 140 to improve integrity and an aesthetic property of the turnover beam body 210. The turnover beam body 210 is provided with a telescopic hole 214, the guide part 220 can be inserted into the telescopic hole 214, and a section of the guide part 220 can protrude from a surface of the turnover beam body 210.

Referring to FIG. 2, the retainer 120 may be provided inside the cabinet 10 of the refrigerator 1, and the retainer 120 is provided with a guide rail 122 opposite to the guide part 220. The guide rail 122 may be configured such that when the door 100 is closed, a section of the guide part 220 enters the guide rail 122, the turnover beam body 210 is gradually unfolded under guidance of the guide rail 122, and after the other door 100 is closed, an edge thereof may abut against the unfolded turnover beam body 210, so as to achieve a sealing effect; the guide rail 122 may also be configured such that when the door 100 is opened, a section of the guide part 220 slides out of the guide rail 122 and the turnover beam body 210 is gradually folded under guidance of the guide rail 122. With the two processes, the other door 100 is not influenced when only the main door provided with the turnover beam body 210 is opened.

Preferably, after the door 100 provided with the turnover beam body 210 is completely closed, the turnover beam body 210 is guided by the guide rail 122 to be at an unfolded position parallel to the door 100, so as to be better attached to the other door 100 to improve the sealing effect. After the door 100 provided with the turnover beam body 210 is opened and the guide part 220 is separated from the guide rail 122, the turnover beam body 210 is guided by the guide rail 122 to be at a folded position perpendicular to the door 100, so as to ensure that when the door 100 is independently closed again, the other door 100 is not affected.

Further, in order to avoid that the turnover beam body 210 is abnormally unfolded (for example, is accidentally touched by a person) after the door 100 provided with the turnover beam body 210 is opened, and collides with the other door 100 when the door is closed again, in the turnover beam assembly 200 in the present embodiment, the locking part 230 is fitted with the stopping portion 326*a* of the pivoting part, and the turnover beam body 210 is located at the folded position after the door is opened.

Referring to FIGS. 3 to 9, specifically, the locking part 230 is telescopically provided in the accommodating chamber 212, a fixing hole 238 (see FIG. 5) is formed on the first end 231 of the locking part 230, a fixing pin 224 (see FIG. 13) is convexly formed at a position opposite to the fixing hole 238 in a section of the guide part 220 located in the accommodating chamber 212, and the fixing pin 224 extends into the fixing hole 238 to fixedly connect the first end 231 of the locking part 230 and the guide part 220. The locking portion 233 is formed transversely on the second end 232 of the locking part 230, and the stopping portion 326*a* fitted with the locking portion 233 is provided on the pivoting part of the turnover beam body 210.

Referring to FIG. 9, a section of the guide part 220 protruding from the turnover beam body 210 when the guide part 220 is in a state of naturally protruding from the turnover beam body 210 may be configured to be slightly higher than a depth of the guide rail 122 of the retainer 120. When the door 100 where the turnover beam body 210 is located is closed, the guide part 220 enters the guide rail 122 and drives the locking part 230 to retract towards an interior of the accommodating chamber 212 under pressing of an upper surface of the guide rail 122, such that the locking portion 233 formed at the second end 232 of the locking part 230 is separated from the stopping portion 326*a* of the pivoting part. At this point, the turnover beam body 210 is in an unlocked state, and can rotate to the unfolded position with the guide part 220 under an action of the guide rail 122, and when the door 100 is completely closed, the turnover beam body 210 is completely unfolded.

Referring to FIGS. 7 and 9, in the present embodiment, the elastic part 240 may also provide, for the locking part 230, the elastic pre-tightening force for urging the locking part to extend for a locked state of the door 100; that is, when the guide part 220 is pressed by a lower surface of the guide rail 122, the elastic part 240 may be in a compressed state (as shown in FIG. 9) and generate the elastic pre-tightening force, and the elastic pre-tightening force may urge the locking part 230 to move towards the extending direction. When the door 100 is opened and after the guide part 220 is separated from the upper surface of the guide rail 122 (as shown in FIG. 7), the pressing force of the guide part 220 by the upper surface of the guide rail 122 disappears, and the guide part 220 and the locking part 230 move in a direction of extending out of the accommodating chamber 212 under an action of the elastic pre-tightening force of the elastic part 240, such that the locking portion 233 formed at the second end 232 of the locking part 230 abuts against the stopping portion 326*a* of the pivoting part. At this point, the turnover beam body 210 is in the locked state; that is, when the door 100 where the turnover beam body 210 is located is opened and after the guide part 220 is separated from the retainer 120, the turnover beam body 210 is locked and stably folded.

As described in the background section, the turnover beam in the prior art has certain defects. First, in the prior art, return of the protrusion and the link mechanism of the turnover beam is independently realized using a plurality of return springs, resulting in poor coordination between the protrusion and the link mechanism and poor reliability; and second, the link mechanism of the turnover beam in the prior art has a complex structure, a large occupied space, difficult mounting and poor part universality and is not conducive to mass production.

In order to overcome the above-mentioned defects of the prior art, in the turnover beam assembly 200 in the present embodiment, an anti-turnover function of the turnover beam body 210 is achieved by adopting one locking part 230 and one elastic part 240. That is, the locking part 230 and the guide part 220 are fixedly connected, the locking part 230 is in the unlocking state when the guide part 220 is pressed down by the retainer 120, and the guide part 220 directly drives the locking part 230 to be in the locking state after the guide part 220 is separated from the retainer 120. Therefore, compared with the prior art, for the turnover beam assembly 200 in the present embodiment, a traditional transmission structure is simplified, an internal structure of the turnover beam assembly 200 is more reasonable, part universality is high, mass production is facilitated, and coordination among components is improved.

Referring to FIGS. 4 and 5, in some embodiments, a middle portion of the locking part 230 is provided with a sliding hole 234 extending in the telescopic direction of the locking part, and a limiting groove 235 is formed in a side wall of at least one side of the sliding hole 234; the turnover beam assembly 200 may further include: a limiting part 250 fixedly provided on the turnover beam body 210 and located at the sliding hole 234, and the limiting part 250 has a projection portion 252 fitted with the limiting groove 235 to limit a telescopic track of the locking part 230.

Since the locking part 230 is telescopically provided in the accommodating chamber 212 in the opening and closing processes of the door 100, in order to limit the telescopic track of the locking part 230 and guarantee a precise stroke of the locking part 230, in the present embodiment, the sliding hole 234 is provided in the middle portion of the locking part 230, the limiting part 250 can penetrate through the sliding hole 234, and when the locking part 230 is telescopic, the limiting groove 235 can slide relative to the projection portion 252 on the limiting part 250, thus limiting a freedom degree of the locking part 230.

Referring to FIGS. 4, 7 and 9, the limiting part 250 further has a first mounting column 254 extending towards the first end 231 of the locking part 230, and a second mounting column 236 is convexly formed on a wall surface of the sliding hole 234 opposite to the first mounting column 254. The first mounting column 254 and the second mounting column 236 are sleeved with two ends of the elastic part 240 respectively.

In the present embodiment, the limiting part 250 is provided at the sliding hole 234 of the locking part 230, such that the freedom degree of the locking part 230 can be restrained with the projection portion 252 thereon, and the elastic part 240 can be provided. Since the limiting part 250 is fixedly provided on the turnover beam body 210, a position of the limiting part 250 is fixed, and one end of the elastic part 240 is provided on the second mounting column 236 on the limiting part 250, which provides support for the elastic part 240, and no other mechanism is required to be provided, thus saving a space and making an arrangement of the accommodating chamber 212 more reasonable.

Referring to FIGS. 5 to 9, in some further embodiments, the locking part 230 further has an abutting portion 237 transversely extending outside the sliding hole 234, and the abutting portion 237 is configured to abut against the limiting part 250 to limit a telescopic distance of the locking part 230.

Since the limiting part 250 is located in the limiting groove 235, the abutting portion 237 transversely extends outside the sliding hole 234, and when the locking part 230 extends out of the accommodating chamber 212, the abutting portion 237 moves towards the limiting part 250, and when the abutting portion 237 abuts against the limiting part 250, the locking part 230 cannot continuously extend out, thus limiting the telescopic distance of the locking part 230, preventing the locking part 230 from excessively extending out, and improving the reliability of the turnover beam assembly 200.

Figure 10:
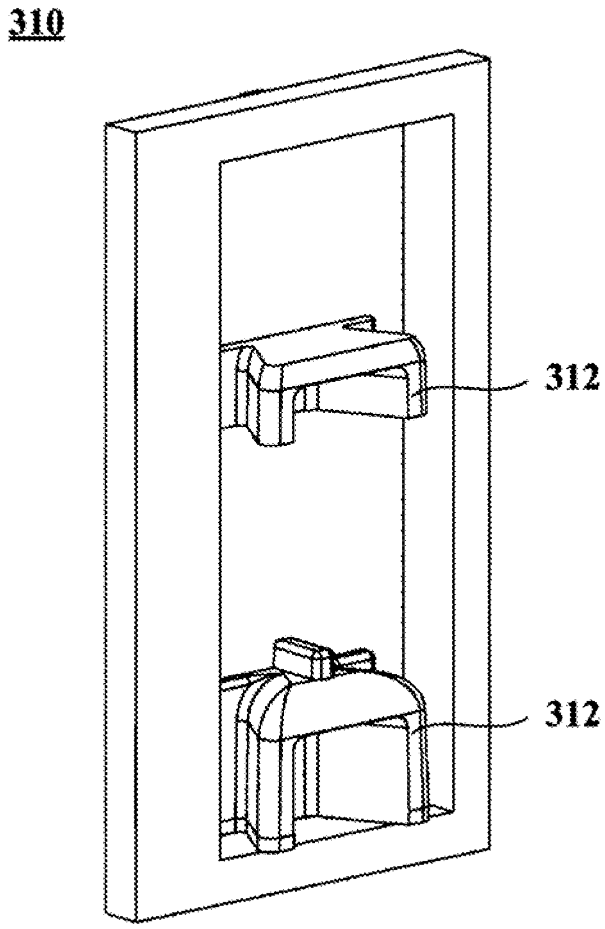
FIG. 10 is a schematic diagram of a fixed portion of a pivoting part in a door assembly according to an embodiment of the present invention.
Figure 11:
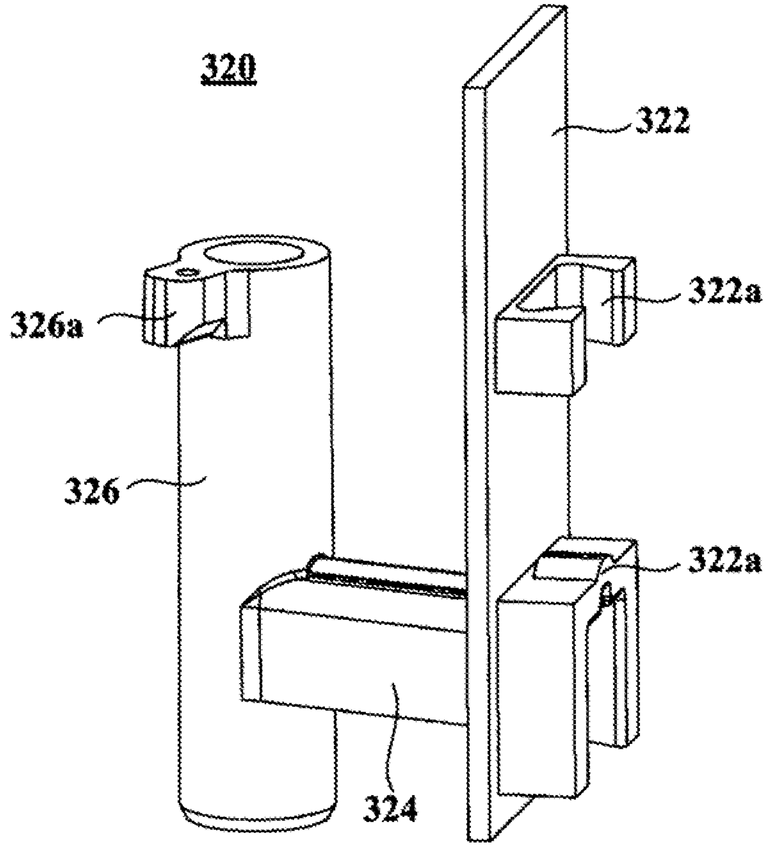
FIG. 11 is a schematic diagram of a rotating shaft portion of a pivoting part in a door assembly according to an embodiment of the present invention.

Referring to FIGS. 3, 10 and 11, FIG. 10 is a schematic diagram of a fixed portion of the pivoting part in the door assembly according to an embodiment of the present invention, and FIG. 11 is a schematic diagram of a rotating shaft portion of the pivoting part in the door assembly according to an embodiment of the present invention. In some embodiments, a door liner 110 is provided on an inner side of the door 100, and the door liner 110 is recessed inwards to form a mounting space 112. The pivoting part may include: a fixed portion 310 provided in the mounting space 112 and provided with a first clamping portion 312; and a rotating shaft portion 320 including a connecting plate 322, a second clamping portion **322*a* clamped to the first clamping portion 312 being formed on one surface of the connecting plate 322 to fix one end of the pivoting part to the door 100**.

In the present embodiment, the pivoting part may serve as a rotation pair of the turnover beam body 210, and the stopping portion **326*a* provided on the pivoting part may be fitted with the locking portion 233 to lock the turnover beam body 210. Specifically, the door liner 110 of the door 100 is provided with an inwards recessed mounting space 112, and a surface of the fixed portion 310 opposite to the first clamping portion 312 is provided in the mounting space 112 and can be fastened by a fastener. The first clamping portion 312 of the fixed portion 310 is fitted with the second clamping portion 322*a* on the connecting plate 322 to connect the pivoting part to the door 100**.

Further, after the connecting plate 322 and the fixed portion 310 are fixed, surfaces of the connecting plate 322 and the door liner 110 may be in a flush state, such that the connection of the pivoting part does not affect smooth turnover of the turnover beam body 210, the surface of the door liner 110 is smooth, and the door 100 is more attractive.

Referring to FIGS. 3, 10, and 11, in some embodiments, the rotating shaft portion 320 may further include a link 324 and a pivoting shaft 326. The link 324 is formed on a surface of the connecting plate 322 opposite to the second clamping portion **322*a*, and extends into the turnover beam body 210; and the pivoting shaft 326 is rotatably provided on an end portion of the link 324 in the turnover beam body 210. The stopping portion 326*a* is formed on the pivoting shaft 326**.

In the present embodiment, the turnover beam body 210 has an opening (not shown), the link 324 extends from the surface of the connecting plate 322 opposite to the second clamping portion **322*a* and passes through the opening into the accommodating chamber 212, and the pivoting shaft 326 can be rotatably provided on the link 324 by a shaft sleeve, or the like, such that the turnover beam body 210 can be overturned around the pivoting shaft 326**.

Figure 12:
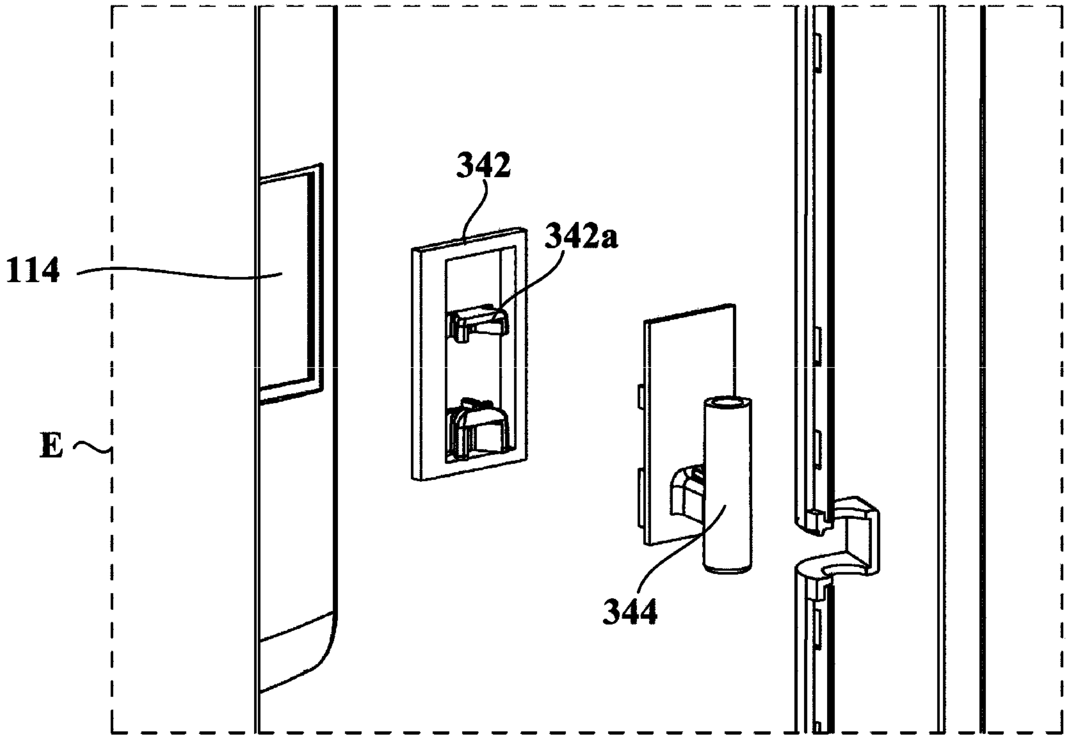
FIG. 12 is an enlarged view at E of FIG. 3 showing a lower pivoting portion in an exploded state.

Referring to FIGS. 3 and 12, FIG. 12 is an enlarged view at E of FIG. 3 showing an exploded state of a lower pivoting portion. In some other embodiments, the turnover beam assembly 200 may include a middle pivoting part 330 and a bottom pivoting part. The middle pivoting part may be directly connected to a middle portion of the door liner 110 of the door 100.

The bottom pivoting part may further include a bottom fixed portion 342 and a bottom rotating shaft portion 344, the door liner 110 is further provided with a bottom mounting space 114 at a position corresponding to the bottom pivoting part, the bottom fixed portion 342 is fixedly provided in the bottom mounting space 112, the bottom fixed portion 342 is provided with a third clamping portion **342*a*, and the bottom rotating shaft portion 344 is provided with a fourth clamping portion (not shown) clamped to the third clamping portion 342*a*, so as to fix the bottom pivoting part to the door liner 110 of the door 100**.

In order to realize smooth turnover, a traditional turnover beam body is generally provided with three rotating shafts mounted at the door. In order to realize smooth rotation of the three rotating shafts, axes of the three shafts have to be on the same rotation axis, but in actual assembly, such a process requirement is difficult to realize, thus increasing mounting and assembly difficulty. In order to overcome the above defect, in the present embodiment, the bottom pivoting part and the pivoting part are fixedly provided on the door liner 110 of the door 100 in a clamped manner, so as to ensure that axes of the bottom pivoting part and the pivoting part are on the same rotation axis; one end of the middle pivoting part can be directly connected to the door liner 110 of the door 100, and precision of the middle pivoting part can be reduced, such that the middle pivoting part has an assisting effect, thereby ensuring that the turnover beam body 210 can be smoothly overturned, and reducing the assembly difficulty.

Referring to FIG. 4, in some embodiments, the turnover beam body 210 has a telescopic hole 214 for the guide part 220 to extend out, a circumference of the telescopic hole 214 is convexly provided with a reinforcing rib 216, the reinforcing rib 216 may partially or fully wrap the guide part 220, and the reinforcing rib 216 is attached to a section of the guide part 220 extending out of the telescopic hole 214.

As the retainer 120 presses down the guide part 220, the guide part 220 may be deviated from the telescopic track or shaken. In the present embodiment, when the door 100 is closed, the reinforcing rib 216 may enter the guide rail 122 of the retainer 120 with the guide part 220, so as to improve strength of the guide part 220 and ensure that the guide part 220 moves on the preset telescopic track.

Figure 13:
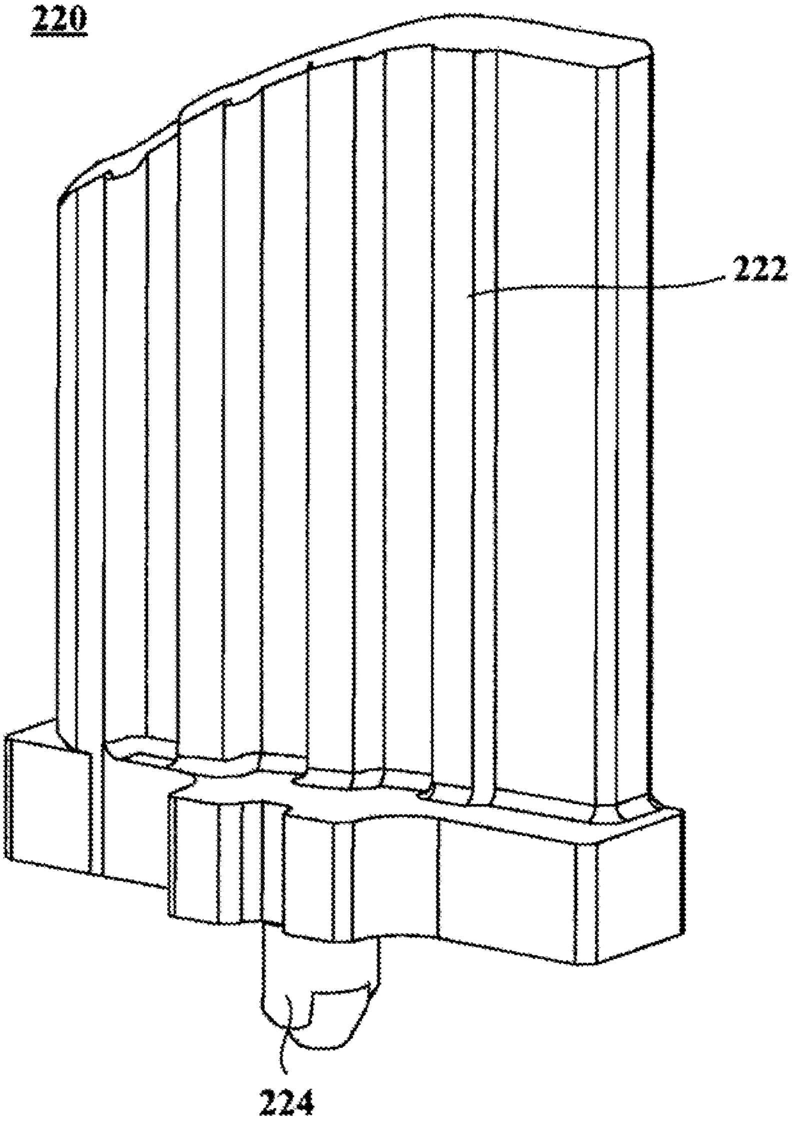
FIG. 13 is a schematic diagram of a guide part in a door assembly according to an embodiment of the present invention.

Further, referring to FIGS. 4 and 13, FIG. 13 is a schematic diagram of the guide part 220 in the door 100 assembly according to an embodiment of the present invention. The reinforcing rib 216 is also provided with a guide groove **216*a*; and a guide projection 222 is further formed on a surface of the guide part 220 facing the reinforcing rib 216, and the guide projection 222 is fitted with the guide groove 216*a* to limit a moving track of the guide part 220**.

In the present embodiment, extending directions of the guide groove **216*a* and the reinforcing rib 216 may be the telescopic direction of the guide part 220, for example, a vertical direction, and cooperation of the guide groove 216*a*** and the reinforcing rib 216 may further improve the strength of the guide part 220 in the telescopic direction thereof, guarantee the telescopic precision of the guide part 220, and improve the reliability of the turnover beam assembly 200.

In the door assembly according to the present invention, the turnover beam body 210 is configured to be provided on the door 100 in the turnover manner by the pivoting part, the locking part 230 is telescopically provided in the turnover beam body 210 of the door 100, the first end 231 of the locking part 230 is fixedly connected with the guide part 220 of the door 100, the second end 232 of the locking part 230 has the locking portion 233 for limiting the turnover of the turnover beam body 210 of the door 100, and the elastic part 240 can apply, to the locking part 230, the elastic pre-tightening force for urging the locking part to extend for the locked state of the door 100. When the door 100 where the turnover beam body 210 is located is closed, the guide part 220 enters the guide rail 122 and drives the locking part 230 to retract under pressing of the upper surface of the guide rail 122, such that the locking portion 233 is separated from the stopping portion 326*a* of the pivoting part. When the door 100 where the turnover beam body 210 is located is opened and after the guide part 220 is separated from the upper surface of the guide rail 122, the pressing force of the guide part 220 by the upper surface of the guide rail 122 disappears, and the guide part 220 and the locking part 230 extend out under the action of the elastic pre-tightening force of the elastic part 240, such that the locking portion 233 abuts against the stopping portion 326*a* of the pivoting part; that is, the locking part 230 is in the locking state.

Further, in the door assembly according to the present invention, the middle portion of the locking part 230 is provided with the sliding hole 234 extending in the telescopic direction of the locking part, the limiting groove 235 is formed in the side wall of at least one side of the sliding hole 234, the limiting part 250 is fixedly provided on the turnover beam body 210 and located at the sliding hole 234, and the limiting part 250 has the projection portion 252 fitted with the limiting groove 235, so as to limit the telescopic track of the locking part 230. The limiting part 250 further has the first mounting column 254 extending towards the first end 231 of the locking part 230, the second mounting column 236 is convexly formed on the wall surface of the sliding hole opposite to the first mounting column 254, and the first mounting column 254 and the second mounting column 236 are sleeved with the two ends of the elastic part 240 respectively. The locking part 230 further has the abutting portion 237 transversely extending outside the sliding hole 234, and the abutting portion 237 is configured to abut against the limiting part 250 to limit the telescopic distance of the locking part 230. Therefore, the limiting part 250 in the door 100 assembly according to the present invention can not only restrain the freedom degree of the locking part 230 with the projection portion 252 thereon, but also be configured to be provided with the elastic part 240, and can also prevent the locking part 230 from excessively extending, thus improving the reliability of the turnover beam assembly 200.

So far, it should be appreciated by those skilled in the art that while various exemplary embodiments of the invention have been shown and described in detail herein, many other variations or modifications which are consistent with the principles of this invention may be determined or derived directly from the disclosure of the present invention without departing from the spirit and scope of the invention. Accordingly, the scope of the invention should be understood and interpreted to cover all such other variations or modifications.

What is claimed is:

1. A door assembly for a refrigerator, comprising two oppositely arranged doors and a turnover beam assembly, wherein the turnover beam assembly comprises:

a turnover beam body configured to be provided on one of the doors in a turnover manner by a pivoting part;

a guide part extending out of one end of the turnover beam body and configured to be fitted with a retainer provided on a cabinet of the refrigerator;

a locking part telescopically provided in the turnover beam body and having a first end fixedly connected with the guide part and a second end having a locking portion for limiting turnover of the turnover beam body, the locking part being configured to have a retracted unlocking state and an extended locking state, and when the locking part is in the unlocking state, the locking portion abutting against a stopping portion provided on the pivoting part; and an elastic part configured to apply, to the locking part, an elastic pre-tightening force for urging the locking part into the locking state; and the turnover beam assembly is configured such that:

when the door where the turnover beam body is located is closed, the guide part is pressed down by the retainer to keep the locking part in the unlocking state; and when the door where the turnover beam body is located is opened and after the guide part is separated from the retainer, the locking part is in the locking state under an action of the elastic pre-tightening force;

wherein the turnover beam body is provided with a telescopic hole for the guide part to extend out, at least one part of a circumference of the telescopic hole is convexly provided with a reinforcing rib, and the reinforcing rib is attached to a section of the guide part extending out of the telescopic hole, so as to prevent the guide part from shaking in the process of fitting with the retainer;

wherein a guide groove is further formed in the reinforcing rib; and a guide projection is further formed on a surface of the guide part facing the reinforcing rib, and the guide projection is fitted with the guide groove to limit a moving track of the guide part.

2. The door assembly according to claim 1, wherein:

a middle portion of the locking part is provided with a sliding hole extending in the telescopic direction of the locking part, and a limiting groove is formed in a side wall of at least one side of the sliding hole; and the turnover beam assembly further comprises:

a limiting part fixedly provided on the turnover beam body and located at the sliding hole, the limiting part having a projection portion fitted with the limiting groove to limit a telescopic track of the locking part.

3. The door assembly according to claim 2, wherein:

the limiting part further has a first mounting column extending towards the first end of the locking part, and a second mounting column is convexly formed on a wall surface of the sliding hole opposite to the first mounting column; and the first mounting column and the second mounting column are sleeved with two ends of the elastic part respectively.

4. The door assembly according to claim 2, wherein:

the locking part further has an abutting portion transversely extending outside the sliding hole, and the abutting portion is configured to abut against the limiting part to limit a telescopic distance of the locking part.

5. The door assembly according to claim 1, wherein:

a door liner is provided on an inner side of the door, and the door liner of the door where the turnover beam body is located is inwards recessed to form a mounting space; and the pivoting part comprises:

a fixed portion provided in the mounting space and provided with a first clamping portion; and a rotating shaft portion comprising a connecting plate, a second clamping portion clamped to the first clamping portion being formed on one surface of the connecting plate to fix one end of the pivoting part to the door.

6. The door assembly according to claim 5, wherein the rotating shaft portion further comprises:

a link formed on a surface of the connecting plate opposite to the second clamping portion, and extending into the turnover beam body; and a pivoting shaft rotatably provided on an end portion of the link in the turnover beam body, the stopping portion being formed on the pivoting shaft.

7. The door assembly according to claim 5, wherein:

after the connecting plate and the fixed portion are fixed, the connecting plate is flush with a surface of the door liner.

8. A refrigerator, comprising the door assembly according to claim 1.

9. A door assembly for a refrigerator, comprising two oppositely arranged doors and a turnover beam assembly, wherein the turnover beam assembly comprises:

a turnover beam body configured to be provided on one of the doors in a turnover manner by a pivoting part;

a guide part extending out of one end of the turnover beam body and configured to be fitted with a retainer provided on a cabinet of the refrigerator;

a locking part telescopically provided in the turnover beam body and having a first end fixedly connected with the guide part and a second end having a locking portion for limiting turnover of the turnover beam body, the locking part being configured to have a retracted unlocking state and an extended locking state, and when the locking part is in the unlocking state, the locking portion abutting against a stopping portion provided on the pivoting part; and an elastic part configured to apply, to the locking part, an elastic pre-tightening force for urging the locking part into the locking state; and the turnover beam assembly is configured such that:

when the door where the turnover beam body is located is closed, the guide part is pressed down by the retainer to keep the locking part in the unlocking state; and when the door where the turnover beam body is located is opened and after the guide part is separated from the retainer, the locking part is in the locking state under an action of the elastic pre-tightening force;

wherein a middle portion of the locking part is provided with a sliding hole extending in the telescopic direction of the locking part, and a limiting groove is formed in a side wall of at least one side of the sliding hole; and the turnover beam assembly further comprises:

a limiting part fixedly provided on the turnover beam body and located at the sliding hole, the limiting part having a projection portion fitted with the limiting groove to limit a telescopic track of the locking part;

wherein the locking part further has an abutting portion transversely extending outside the sliding hole, and the abutting portion is configured to abut against the limiting part to limit a telescopic distance of the locking part.

10. The door assembly according to claim 9, wherein:

the limiting part further has a first mounting column extending towards the first end of the locking part, and a second mounting column is convexly formed on a wall surface of the sliding hole opposite to the first mounting column; and the first mounting column and the second mounting column are sleeved with two ends of the elastic part respectively.

11. The door assembly according to claim 9, wherein:

a door liner is provided on an inner side of the door, and the door liner of the door where the turnover beam body is located is inwards recessed to form a mounting space; and the pivoting part comprises:

a fixed portion provided in the mounting space and provided with a first clamping portion; and a rotating shaft portion comprising a connecting plate, a second clamping portion clamped to the first clamping portion being formed on one surface of the connecting plate to fix one end of the pivoting part to the door.

12. The door assembly according to claim 11, wherein the rotating shaft portion further comprises:

a link formed on a surface of the connecting plate opposite to the second clamping portion, and extending into the turnover beam body; and a pivoting shaft rotatably provided on an end portion of the link in the turnover beam body, the stopping portion being formed on the pivoting shaft.

13. The door assembly according to claim 11, wherein:

after the connecting plate and the fixed portion are fixed, the connecting plate is flush with a surface of the door liner.

14. The door assembly according to claim 9, wherein:

the turnover beam body is provided with a telescopic hole for the guide part to extend out, at least one part of a circumference of the telescopic hole is convexly provided with a reinforcing rib, and the reinforcing rib is attached to a section of the guide part extending out of the telescopic hole, so as to prevent the guide part from shaking in the process of fitting with the retainer.

15. The door assembly according to claim 14, wherein:

a guide groove is further formed in the reinforcing rib; and a guide projection is further formed on a surface of the guide part facing the reinforcing rib, and the guide projection is fitted with the guide groove to limit a moving track of the guide part.

* * * * *